United States Patent Office 3,369,620
Patented Feb. 20, 1968

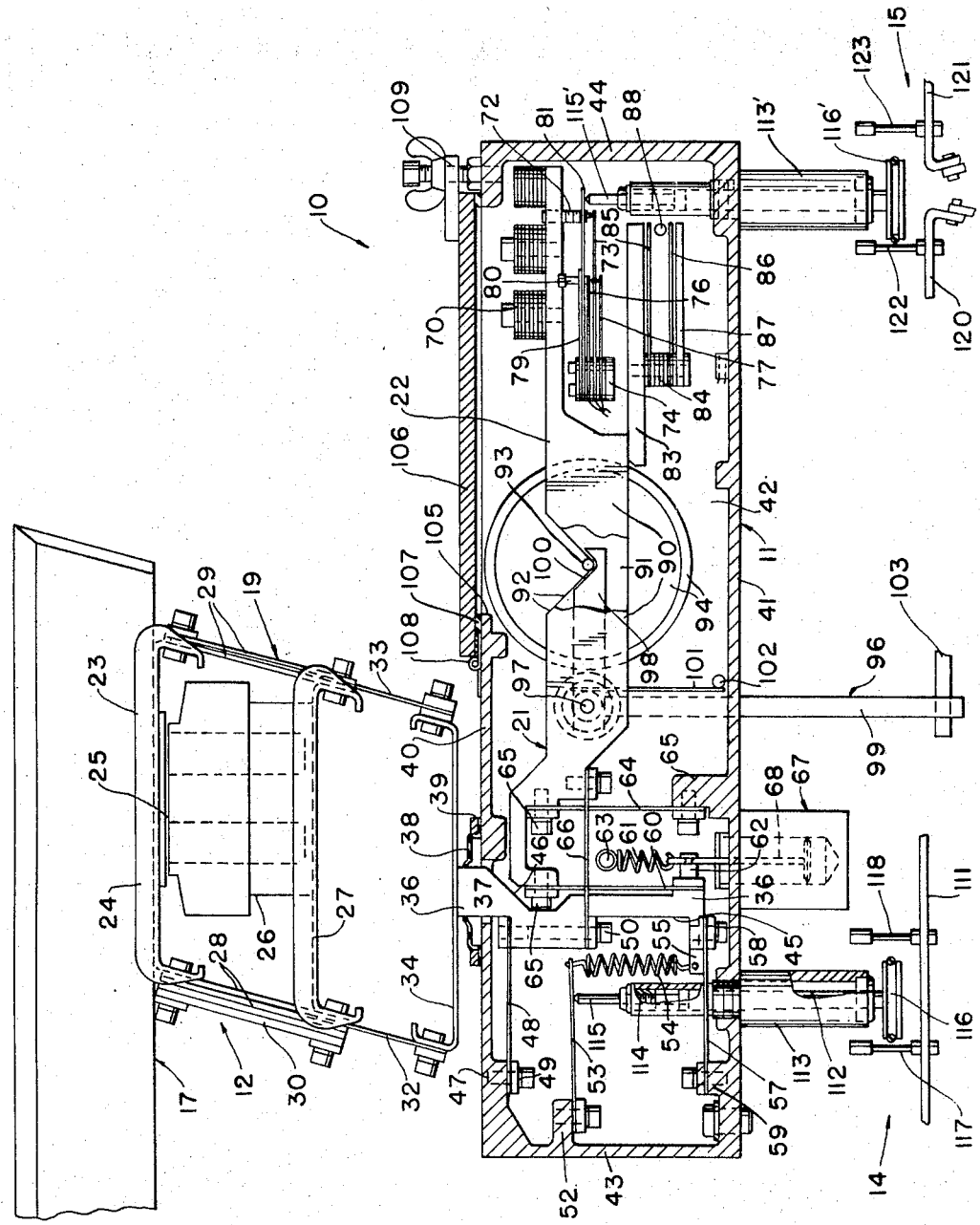

3,369,620
WEIGHER HEAD
Donald W. Garnett, Grand Ledge, Mich., assignor to The Olofsson Corporation, Lansing, Mich., a corporation of Michigan
Filed June 9, 1965, Ser. No. 462,674
16 Claims. (Cl. 177—229)

ABSTRACT OF THE DISCLOSURE

A weigher head is provided for use in high speed, high precision rotary weighing machines, in which head a system of leaf springs is substituted for the usual means by which a scale beam within the housing of the head is pivoted. The springs include a pair which are horizontally disposed, each being anchored at one end to the housing and at the opposite end thereof secured to a vertically disposed member by which a weighing receptacle associated with the head is supported. The leaf springs further include a vertically disposed pair, one of which is anchored at one end to the housing, being secured at its opposite end to the scale beam, and the other of which is secured at its opposite ends to the beam and to the receptacle supporting member. The head also includes further means by which the scale beam is periodically "zeroed" to compensate for the disturbing effect of a possible accretion of grease, coating material or the like upon the weighing receptacle, as well as to compensate out other factors influencing high-precision weighing. Provision is also made to make adjustments for the purpose of maintaining precise accuracy of weighing within predetermined high and low goal limits.

---

The present invention relates to an improved weigher head of a type used in multiple in weighing apparatus such as is the subject matter of my copending application, Ser. No. 409,503, filed November 6, 1964, now Letters Patent No. 3,339,651 of September 5, 1967. That application in turn is directed to improvements in weighing machines in accordance with Letters Patent No. 3,156,311 of November 10, 1964 to Olofsson and Garnett. More particularly, the present invention concerns a weigher head having an improved floating mount for the scale beam which supports from beneath a weighing receptacle, to which discrete product or material to be weighed is charged in an excess overweight, and then vibrated to dribble feed or trim off the exact amount of the excess weight of material to bring the charge to an exact weight value.

The Letters Patent above identified have as their subject matter a rotary type turret machine upon which a plurality of the weigher heads are arranged in a circumferential, horizontally traveling array. Earlier Letters Patent to Garnett and Olofsson, No. 3,094,182 of June 18, 1963 also have this type of weigher as their subject matter.

In common with the majority of weigher heads for machines of the type referred to above, the scale beam supporting the weighing receptacle, regardless of what type the latter might be, is very delicately balanced on horizontally aligned journal or bearing means, for example, of a ball bearing or needle type. However, during an extended life of use in practically continuous daily operation, such bearing provisions tend to brinell, with consequent play or lost motion which is highly detractive in respect to desired accuracy. Moreover, the need for periodic inspection, servicing, maintenance or repair arises, representing time in which the weighing machine is non-productively "down."

It is therefore a general object of the present invention to provide a weigher head having a scale beam supporting a weighing receptacle, this beam being itself supported through the agency of floating mounting means which are entirely free of conventional mechanical pivots, bearings and journal components.

More specifically, such beam balancing provisions comprise plural sets of elongated, flat leaf springs of substantial length, as well as width in the transverse direction of a vertical plane in which they support the scale beam for floating action. The sets are herein shown in the form of a pair of parallel upright leaf springs and a set of three horizontal and parallel leaf springs; and they afford the desired floating mount for the scale beam both in the horizontal direction of its length and in the vertically transverse direction. Moreover, the relatively wide leaf springs, as fixedly clamped at opposite ends to anchoring components and to moving beam components, also afford a desired and necessary stability for the beam in the horizontal direction transversely of its length.

However, it is contemplated that the exact number and disposition, position-wise, of the leaf springs of the respective sets may be altered, so long as a universal floating mount of the scale beam in a stably guided vertical plane can be had.

Still more specifically, it is an object of the invention to provide a floating scale beam mount for a weigher head, in which the plural leaf springs employed for the purpose are fabricated in the form of laminated fiberglass filaments of substantial length and horizontal width transversely of the plane just referred to; and in which an enclosed and sealed housing or casing for the scale beam is provided with integral formations or bosses to which ends of certain of the leaf springs are fixedly secured, certain other of the leaf springs having attachment at opposite ends thereof to beam components which they assist in floating.

More generally, it is an object of the invention to provide a weigher head having a leaf spring-suspended scale beam as referred to above, the weigher head also incorporating certain automatic beam zeroing means and goal seeking and signaling means, of the type shown and described in my patent identified above, as well as in the above identified patent to Olofsson et al.

I am aware that it has heretofore been proposed to sustain weighing receptacles of a rotary turret type machine by means of parallel leaf springs, lacking associated scale beam structure. However, with these springs naturally biased downwardly at their free ends by the weighing receptacle and its load content, and otherwise unrestrained, the effect of centrifugal force in rotation is to straighten the leaf springs toward a true horizontal alignment, and to this extent to lessen the effect of the true weight. However, the weigher head of the present invention, in coupling with a pair of horizontal and parallel leaf springs a further set or pair of vertical leaf springs to afford a parallelogram type leaf spring structure, provides vertical support preventing the disturbing effect of centrifugal force mentioned above.

Moreover, it has been found that weighers relying solely on a pair of leaf springs to sustain the weighing receptacle are objectionably responsive to the effect of vibration of the weighing machine, as a whole, in operation. That is, as the turret structure tends to vibrate vertically, this effect is naturally transmitted to the inner supported ends of the leaf springs, which naturally react with opposite effect at their outer ends, thus in another respect disturbing true weighing accuracy. However, in a weigher head such as the present, this disturbing vibratory effect is compensated out at the scale beam component thereof, with which leaf spring sets are associated in the manner described above. In other words, the vertically downward force of the receptacle load at one end of the scale beam structure accompanies vertically downwardly acting forces on the opposite end of the scale beam, i.e., opposite from the load to what would amount to the fulcrum of a knife edge or bearing-pivoted beam, so that machine vibration has greatly reduced effect on weighing accuracy.

The foregoing as well as other objects will become more apparent as this description proceeds, especially when considered in connection with the accompanying drawing illustrating the invention, wherein:

The figure is a view in side elevation and section in a vertical plane just inwardly of one of the side walls of the housing of the weigher unit, i.e., looking horizontally toward the opposite side wall.

The improved weigher head of the invention is generally designated by the reference numeral 10. It comprises an elongated rectangular, well sealed box-like housing or casing 11 of aluminum, within which a scale beam structure (to be described) supports from beneath a vibratory tray or pan assembly generally designated by the reference numeral 12. There will be a plurality of such weigher head and vibratory units, for example fifteen or more, supported in an annular array by rotary table or turret means for continuous, motor-driven rotative travel in a horizontal plane. The rotary supporting structure is intended to be of the type illustrated and described in the patents identified above.

Also associated with the weigher head 10 are certain components of a fixedly mounted, electromagnetic scale beam zeroing unit 14 and a further fixedly mounted, goal weight seeking and adjusting unit 15. The unit 14 serves to initiate a periodic compensation of the balance of a scale beam in head 10 to offset error tending to arise from certain disturbing effects; while the unit 15 serves to initiate signals reflecting charges insufficiently close in weight to a desired goal weight, all as described in my Patent No. 3,339,651. In any event, the actions of the units 14, 15, in effecting periodic zeroing and goal weight adjustments on certain beam-biasing and beam-carried electrical switch components of the present unit 10, are exactly the same in nature as in the case of the corresponding weigher heads of that application. Accordingly, the present description will not be extended unduly in reference to these signaling and adjusting actions.

In regard to the vibratory weigher receptacle assembly or unit 12, it, too, is similar to the corresponding unit of my Patent No. 3,339,651, hence its features need be but briefly referred to. It comprises an elongated tray or pan 17 extending radially of the rotative path of the weighing heads, and the weighed contents are vibratorily dribble fed-off or trimmed-off during the tray travel to proper weight, then vibratorily dumped completely at a discharge station.

The pan 17 is supported by a known type of electromagnetic vibrator unit, generally designated 19, and the unit 19 is in turn supported by the leaf spring balanced or floated scale beam structure of the invention, as mounted within the housing 11 and generally designated by the reference numeral 21. The structure includes a front-to-rear elongated beam 22 having various provisions for zeroing and for the initiation of the signals, as referred to above, which are hereinafter described.

Typically, the vibratory unit 19 is shown as comprising a horizontal top support 23 on which the pan or receptacle 17 is fixedly secured, the support 23 fixedly carrying on its bottom an electromagnetic armature plate 24 of substantial size. A small air gap 25 exists between the armature plate 24 and an electromagnet field coil 26 directly thereunder, which is supported upon an intermediate cross member 27 of unit 19 paralleling its top support 23. In use coil 26 is energized by a rectified pulsatory voltage.

The upper and lower supporting members 23, 27, respectively, of vibratory unit 19 are fixedly connected at their ends to one another by pairs of upwardly inclined, laminated fiberglass leaf springs 28, 29, with an upright rubber strap device 30 adjacent the forward pair to limit vibratory throw of receptacle 17.

As thus spring-interconnected, the supports 23, 27 are resiliently secured by a pair of upwardly inclined front and rear isolation leaf springs 32, 33, respectively, to a bottom cross member 34 of the vibratory unit 19. This member is, in its turn, fixedly secured at its bottom to an upright stem member 36, with which the beam 22 is floatingly associated as part of the scale beam structure 21. The stem 36 extends downwardly through an opening 37 in the top wall of housing 11, and is sealed about this opening, as by a flexible diaphragm type of seal 38, fixedly mounted by a clamp ring 39 to the housing, to prevent entry of dust or foreign matter to the interior of the housing.

The weigher head housing 11, like those of my Patent No. 3,339,651, includes top and bottom walls 40, 41, respectively, in the former of which the opening 37 is provided, side walls 42 and opposed, radially outer and inner, or front and rear, end walls 43, 44. The walls 40, 41 and 43 are formed to provide certain integral internal projections or bosses providing anchors for some of the leaf spring type beam mounting or balancing members of the invention, as will be described. The receptacle supporting stem 36 extends downwardly almost to the bottom of housing wall 41, being formed to provide a pair of opposite side recesses 45, 46 accommodating certain of the spring mounts.

Top housing wall 40 is provided adjacent its radially outer end wall 43 with a thickened integral boss 47, at which a first horizontal leaf spring 48 is secured by a screw 49, the spring 48 extending towards the rear, where its opposite end is fixedly connected to the stem member at 50, as by a long upright screw extending from stem recess 45, which screw also secures an end of another leaf spring, to be described.

The end wall 43 of the housing is formed with a second integral boss 52 at a somewhat elevated point thereon, the boss 52 serving as an anchor for a further, rearwardly projecting horizontal leaf spring 53, and the opposite end of this spring is connected by a coil tension spring 54 with an offset finger or lug 55 on the bottom of stem 36, directly beneath the recess 45 of that stem. Springs 53 and 54 function in the automatic adjustment of bias on scale beam 22 during a zeroing phase in the weighing cycle.

Stem offset finger 55 also has the free end of a third horizontal leaf spring 57 secured thereto as by a screw 58, and the opposite end of spring 57 is anchored at the left to an integral boss formation 59 of bottom housing wall 41.

Next an upright leaf spring 60 is fixedly secured at its bottom end to the side of upright stem 36 opposite the latter's finger 55; and a second upright leaf spring 64 paralleling leaf spring 60 is fixedly anchored at its bottom to a bottom wall boss 65. The free upper ends of the leaf springs 60 and 64 are connected to a forward end of beam 22 of the scale beam structure 21 by screws 65. Finally, this forward beam end is coupled to the receptacle mounting stem component 36 of the scale beam structure, as by a leaf spring 66 connected to the stem by the screw 50.

Actually, the spring 66 is primarily for the purpose of affording stability to the beam and receptacle structure otherwise connected by the sets of parallel arm leaf springs 48, 57 and 60, 64, both in the horizontal transverse direction across the housing walls 42 and in the longitudinal direction of beam 22; and, absent any need for such stabilizing effect, the spring 66 may possibly be omitted.

As shown in the figure, the intermediate horizontal spring 66 just referred to is in horizontal alignment with the center of gravity of beam 22, as master balanced and counterbalanced in the manner to be described, so that there is no tendency to set up a force moment on spring 66 under the centrifugal effect.

A small hydraulic dash-pot unit 67 mounted on the bottom of housing 11 has its plunger rod 68 connected upwardly to the pin 62 on scale beam stem component 36 to stabilize the beam movement; and the plunger rod is biased upwardly adjacent spring 60 by a small coil spring 61, which acts between a laterally extending pin 62 on the stem and an anchor pin 63 fixed on the far housing wall 42. Thus lost motion at the plunger rod connection is prevented, while allowing freedom of alignment of the plunger within the dash-pot. Similar dash-pot devices are shown in the Garnett Patent No. 3,339,651 and the Olofsson et al. patent mentioned above.

Thus, it is seen that the set of three parallel and horizontal leaf springs 48, 57 and 66 coact with the set of two parallel upright leaf springs 60, 64 in providing a floatingly balanced mount for the scale beam 22 which is sensitive with high accuracy to the changing weight of the vibratory receptacle unit or assembly 12, which is free of possible lost motion or play, such as destroys needed accuracy in bearing-journalled beams as the result of brinelling, and which requires no maintenance or other attention whatsoever following initial assembly.

Structurally, the leaf springs 48, 57, 60, 64 and 66 (and certain others herein mentioned) are by preference constituted of a three-layer laminate of epoxy-impregnated glass fiber filament material, in a thickness of, say, 0.030", and in a transverse width slightly less than the horizontal spacing between side walls 42 of housing 11. Typically, this will be of the order of two inches.

To permit the intersecting relation of the horizontal stabilizing spring 66 and the upright stabilizing springs 60, 64, the former is made in a rectangular O-shaped outline and the latter are in a rectangular I-shaped outline, with the stems thereof received in the opening of spring 66. The transverse dimensions of the springs 60, 64 and 66 at the ends thereof are equal and of the width mentioned above.

The impregnated fiberglass material for the springs is dimensionally stable, not subject to atmospheric deformation or deterioration, or to a changed set in bias as the result of working or aging. As dimensioned in width and thickness, the leaf springs 48, 57, 60, 64 and 66 provide a highly desirable spring rate, as well as perfect lateral stabilization of the sweep of the scale beam structure 21 in a vertical plane.

The leaf spring 53 and coil spring 54, as has been indicated above, are employed in an adjustment, during a zeroing phase of the weigher's rotative cycle, to compensate out changes in weight of the empty receptacle 17 such as result from an accumulation or accretion of product coating on the walls of the receptacle, or occur as the result of variations in spring tension or contact conductivity, etc., all as explained in my patent identified above. Means to adjust the bias of spring 54 automatically in the zeroing phase are also the same, hence will be but briefly alluded to later.

The radially rearward or right-hand end of the scale beam 22 is appropriately counterpoised by weights 70 to balance beam 22 against the weight of the vibratory pan assembly 12; and an adjusting set screw 72 is threaded into the beam for downward engagement with a horizontal, intermediate electrical contact 73 of brass leaf spring stock, the screw being appropriately insulated to transmit beam swing to contact 73. Actually, the contact means 73, appearing as a single contactor, represents two separate contacts arranged in parallel, side-by-side relation to one another, these contacts being fixedly mounted at their left-hand end between laminae of an insulating mounting block 74, which is fixed to and extends inwardly of the housing side wall 42.

The contactor means 73 is adapted to engage, in a check weighing phase or phases in the weighing cycle, with pairs of upper and lower spring brass leaf contacts 76, 77 above and below the same, respectively. Here again, the contacts 76 and 77 are dual in nature, arranged in pairs in side-by-side relation to one another. Inasmuch as the provisions of the present invention do not extend to the electrical function of the contact means 73, 76, 77, in which the present weigher head follows in all significant respects the circuitry of my Patent No. 3,339,651 (to which reference may be had), it has not been deemed necessary to further illustrate the contacts or their wiring connections. Like the intermediate contact means, the respective contact means 76 and 77 are fixedly mounted in insulated relation to one another, and to means 73, by the mounting block 74.

The upper contact 76 is further shown as being sustained from above by a relatively less flexible, or even rigid, plate or strap 79 anchored at one end by mounting block 74, this strap adjustably carrying a small set screw 80 which bears downwardly on the free end of contact 76; and an elongated leaf spring 81 of the glass fiber stock is anchored at its left-hand end between the plate or strap 79 and the top lamination of the insulated block 74.

Spring 81 has a clearance opening receiving the screw 80, which adjustably backs the top contact 76; and the spring 81 extends substantially to the right beyond the last named contact for operation in response to the goal seeking and adjusting unit 15, in the same manner as in my patent identified above, and as will be but briefly described at a later point.

The right-hand or rear end of the scale beam 22 is shown as being generally bifurcated in nature (between whose forks the insulated mounting block 74 and its contact provisions are received). To this end a longitudinal plate 83 is suitably fixed to the bottom of the beam, the plate 83 fixedly mounting from above a block 84; and this block anchors the ends of a pair of upper and lower leaf springs 85, 86, respectively, also a motion limiting plate 87 beneath the spring 86. The springs 85, 86 may be of the laminated and impregnated glass fiber stock referred to above, and they extend on either side of a stop pin 88 projecting from the housing side wall 42.

The function of the leaf springs just mentioned is to provide a resiliently cushioned, anti-bounce means to limit maximum swing of scale beam 22, maximum motions of the ends of springs 85, 86 being in turn limited from above and below by the rigid plates 83, 87, respectively. These provisions effectively damp out a possible and undesirable mechanical bounce back and forth of the scale beam in operation.

Intermediate its length, the beam 22 is formed to provide a pair of parallel, transversely spaced arm portions 90, 91, each provided with a V-shaped cleft 92; and a small transverse pin 93, upon which a number of removable weights 94 may be removably mounted, normally rests on the bottom of the aligned clefts 92. These weights, as described in my patent, are selected to aggregate the weight of the intended product to be weighed in pan 17 to an exact value.

As indicated above, the master weights 94 and the beam counterbalance weights 70 are so applied to scale beam 22 that the center of gravity of the latter, as thus weighed, is horizontally aligned with the stabilizing spring 66. Hence, there is no effect of setting up a moment arm on the spring 66 under centrifugal force. The line at which the latter intersects the left-hand upright stabilizing leaf spring 60 connecting stem 36 remains, in effect, horizontally stable, although the springs 60 and 64 will assume a very mild S-shaped outline in action.

Periodically, during a short zeroing phase in the rotative travel of weigher unit 10, the weights 94 are adapted to be raised from scale beam 22, on the principle that, as thus relieved of a master counterpoise, the beam should be in exact balance, as between the weight of its vibratory pan assembly 12, including pan or receptacle 17 and vibratory unit 19, and the main beam counterweight 70. However, the accumulation of deposits on the interior of receptacle 17, or other changing electrical or mechanical phenomena mentioned above, may prevent the balance, or otherwise disturb a response to beam position.

For the purpose in question, a lifter bell crank, generally designated 96, is pivotally mounted at 97 on the far side wall 42 of weigher head housing 11. The bell crank includes lifter arm means 98 acting between the arms 90, 91 of scale beam 22 and a tappet rod 99 depending from the bell crank pivot externally of the far side housing wall, it being understood that the far arm 91 of beam 22 will be formed to provide clearance through which the pivot shaft of bell crank 96 may be received without interfering with the floating movement of the beam. The lifter arm 98 of bell crank 96 is provided with its own small V-shaped cleft 100 adjacent its free end, whereby counterclockwise swing of the arm will engage the master weight-mounting pin 93 and lift the weights 94 out of the clefts 92 of the scale beam 22.

The bell crank 96 is urged in the opposite, clockwise direction by an upright leaf spring 101 anchored at its top in relation to lifter arm 98 and engaging at its bottom against a projecting pin 102 on housing side wall 42. Depending substantially beneath the housing 11, the lower end of tappet rod 99 of the bell crank is adapted to periodically engage a fixed plate cam 103 to occasion the counterclockwise movement of lifter bell crank 96 against the bias of leaf spring 101. These matters are detailed in my Patent No. 3,339,651.

In order to permit access to the scale beam master weight unit 94 and other interior components associated therewith, the top wall 40 of the housing 11 is provided with an elongated opening 105 of substantial size, which is normally tightly closed and sealed by a cover plate 106, with an interposed sealing gasket 107, the plate being horizontally pivoted at 108 and provided with a releasable clamp 109 at its rear end.

As described in detail in my patent, the zeroing unit 14 comprises a horizontal plate 111 which is adapted to be shifted in one horizontal direction by means of an electromagnet (not shown) and returned in the opposite direction by a spring. An upright, reversely rotatable operating stem 112 is suitably journaled in a tubular mount 113 depending from the bottom housing wall 41. This stem is threaded at 114 in the mount 113 and terminates in a reduced top extension 115 which bears from beneath on the leaf spring 53.

Stem 112 is provided beneath the mount 113 with a rubber tired friction wheel 116; and this wheel is engageable, once per rotative cycle of weigher head 10, by one or the other of two upstanding pins 117 or 118 carried by the horizontal plate 111 of the zeroing unit 14.

The motion of pins 117, 118 is in response to an electrical signal at a zeroing phase of the rotative cycle, just after the weighing receptacle 17 has been dumped of its weighed product. In the event the receptacle has increased in weight due to adhered product coating or the like, the engagement of friction wheel 116 with one of the pins 117, 118 will be such as to elevate stem 112 against the leaf spring 53, thus increasing the lifting force exerted by coil spring 54 on the stem 36 to an extent to offset the weight of the adhered product; or to compensate for variations in spring tension, contact conductivity and the like, all as mentioned in my patent.

Referring now to the goal weight signaling unit 15, it comprises a pair of electromagnet assemblies 120 and 121, respectively, carrying upright pins 122 and 123. Otherwise, provisions of the unit 15 are similar to those of the zeroing unit 14, so that corresponding components are designated by corresponding reference numerals primed.

As described in my patent, the signals initiated at both the electromagnetic units 14, 15 are determined in part by the making and breaking of the sets or pairs of contacts 73, 76 and 77; and the position of the top contact 76 is automatically adjusted by changing the upward force exerted by the stem extension 115' on the non-conductive leaf spring 81 which bears the set screw 80 backing the contact 76 from above. Inasmuch as in this respect, and in respect to the upward and downward making and breaking of conducting contact with the pairs of contacts 76 and 77, respectively, the present weigher head 10 is electrically identical, in the making and breaking of electrical contacts, to the head described in detail in my patent, to which reference may be made, it is not deemed necessary or desirable to burden the present description in connection with these features.

In use, motions of the beam 22 of scale beam structure 21 in response to a changing product weight on weighing pan 17 are delicately sustained and guided by the set of three horizontal leaf springs 48, 57 and 66, and the set of two upright lead springs 60, 64. Rolling bearings are completely eliminated, together with their tendency to have play or lost motion after a period of time. The epoxy impregnated glass fiber of the springs in question is inexpensive, yet operable under a long period of time without change of flexure rate. Moreover, it is readily possible to tune these springs at initial installation in the weigher head 10, as by an appropriate selection as to their thickness, length and width. As indicated above, they are dimensionally stable under changing atmospheric conditions and throughout their life.

The action of the leaf spring sets 48, 57, 66 and 60, 64, respectively, is similar to that of a parallelogram motion, which, despite the flexible character of the parallelogram arms, is well stabilized, first, by the disposition of the upper and lower leaf springs 48, 57 with their connections to the stem 36 approximately equidistant from the intermediate horizontal spring 66 on opposite sides of the latter, secondly, the vertical stabilization of beam 22 afforded by the upright leaf spring pair 60, 64 and, thirdly, by the substantial lateral width of the several springs transversely of their length, to afford stability against horizontal shift transversely of the housing interior.

As explained above, the intermediate spring 66 also has transverse stabilization effect on the floating beam structure, as well as longitudinal effect.

In all, the accuracy of the combined scale beam structure 21 and the leaf spring provisions which connect it to the stem 36 supporting the vibratory pan unit 19 is insured against all disturbing effects found to arise in previous leaf spring type, rotary turret weighers. The beam 22, as it supports the load at parallel horizontal leaf springs 48, 57, is disciplined by the spring pair 60, 64 against the normal tendency to rise as the result of centrifugal force, hence is subject to no disturbance of its weighing action from this effect.

By the same token, the combination of the leaf spring sets with a mechanical scale beam 12, to which the downward forces of the receptacle unit 19 and of the master weight and counterweight means 94, 97 are applied, in effect, at opposite sides of what would normally represent the fulcrum knife edge of bearing of a mechanically pivoted beam, is such as to be proof against loss of accuracy due to vibration of the rotary structure of the weighing machine as a whole. This is to be distinguished from the vulnerability of previous types of parallel leaf spring-supported weigher units.

What I claim as my invention is:

1. A weigher head constituting one of a number of rotating heads of a rotary weighing machine, said head comprising fixed anchor means, a weighing receptacle member, a beam member having means operatively connecting the same to said weighing receptacle member to support the latter for movement in a vertical plane in the weight-balancing of said receptacle member and its content, said means providing a floating mount of said receptacle and beam members for said movement and comprising a pair of substantially parallel and horizontal leaf springs each connected at one end thereof to said fixed anchor means and adjacent the opposite end thereof to said receptacle member, thereby affording a flexible parallel arm suspension for said members, and at least one further leaf spring disposed at a substantial angle to the springs of said pair, said further spring being connected to said fixed anchor means at one end and connected at its opposite end to one of said beam and receptacle members to assist and stabilize said suspension, a master weight normally carried by said beam member, and means operatively connected to said master weight to lift the latter from the beam member in the rotation of the head on the machine.

2. The weigher head of claim 1, in which said further spring is connected at said opposite end thereof to said beam member.

3. The weigher head of claim 1, in which there are a pair of said further leaf springs in substantially parallel relation to one another, the second spring of said further pair being connected adjacent its opposite ends to said beam and receptacle members.

4. The weigher head of claim 1, in which said leaf springs are of impregnated glass fiber stock.

5. A weigher head constituting one of a number of rotating heads of a rotary weighing machine, said head comprising fixed anchor means, a weighing receptacle member, a beam member having means operatively connecting the same to said weighing receptacle member to support the latter for movement in a vertical plane in the weight-balancing of said receptacle member and its content, said means providing a floating mount of said receptacle and beam members for said movement and comprising a pair of substantially parallel and horizontal leaf springs each connected at one end thereof to said fixed anchor means and adjacent the opposite end thereof to said receptacle member, thereby affording a flexible parallel arm suspension for said members, and at least one further leaf spring disposed at a substantial angle to the springs of said pair, said further spring being connected at its opposte ends to said beam and receptacle members respectively to assist and stabilize said suspension, a master weight normally carried by said beam member, and means operatively connected to said master weight to lift the latter from the beam member in the rotation of the head on the machine.

6. A weigher head constituting one of a number of rotating heads of a rotary weighing machine, said head comprising a fixed anchor, a movable scale beam structure, said structure comprising a member supporting a weighing receptacle and a scale beam member having means connecting the same to said supporting member for movement with the latter in a vertical plane in the weight-balancing of said weighing receptacle and its content, said connecting means comprising a first pair of parallel and horizontal leaf springs each connected adjacent one end thereof to said fixed anchor and adjacent the opposite end thereof to said supporting member, and a further pair of parallel leaf springs disposed substantially normal to those of said first pair, one spring of which further pair is connected adjacent its ends between said fixed anchor and said beam member and the other spring of which further pair is connected adjacent its respective opposite ends to said beam and supporting members, a master weight normally carried by said beam member, and means operatively connected to said master weight to lift the latter from the beam member in the rotation of the head on the machine.

7. The weigher head of claim 6, and additionally comprising a further, generally horizontal leaf spring disposed between the first named springs of said first pair and connected adjacent opposite ends thereof to said beam and supporting members.

8. A weigher head comprising a housing enclosing a movable scale beam structure, said structure comprising a member supporting a weighing receptacle externally of the housing, and a scale beam member having means connecting the same to said supporting member for movement with the beam member in a vertical plane in the weight-balancing of said weighing receptacle and its content, said connecting means comprising a first set of substantially parallel leaf springs, at least one of which is connected adjacent its opposite ends between said beam member and said supporting member and another of which is connected adjacent its opposite ends to said housing and beam member, and a further set of substantially parallel leaf springs disposed at a substantial angle to said first set, one spring of said further set being connected adjacent its opposite ends between said housing and supporting member and another spring of said further set being connected adjacent its opposite ends to said beam and supporting members.

9. The weigher head of claim 8, and further comprising an adjusting leaf spring connected at one end to said housing, and a coil spring connected between said adjusting leaf spring and said supporting member to bias the latter in one direction, said coil spring having means engageable therewith to vary the bias thereof.

10. The weigher head of claim 8, in which the leaf springs of said sets are of impregnated plastic stock.

11. The weigher head of claim 8, in which the leaf springs of said sets are of impregnated plastic stock and are of a transverse width somewhat less than the internal width of said housing, thus stabilizing said suspension.

12. The weigher head of claim 8, in which said further set includes a further leaf spring connected between its ends between said housing and said supporting members, said further leaf spring being located intermediate of and in general parallelism with said named springs of the further set.

13. The weigher head of claim 12, and further comprising an adjusting leaf spring connected at one end to said housing, and a coil spring connected between said adjusting leaf spring and said supporting member to bias the latter in one direction.

14. The weigher head of claim 13, and further comprising automatically acting means to vary the bias exerted by said coil spring.

15. The weigher head of claim 13, in which the leaf springs of said sets are of impregnated plastic stock.

16. A weigher head comprising fixed anchor means, a weighing receptacle member, a beam member having means operatively connecting the same to said weighing receptacle member to support the latter for movement in a vertical plane in the weight-balancing of said receptacle member and its content, said means providing a floating mount of said receptacle and beam members for said movement and comprising a pair of substantially parallel and horizontal leaf springs each connected at one end thereof to said fixed anchor means and adjacent the opposite end thereof to said receptacle member, thereby affording a flexible parallel arm suspension for said members, and at least one further leaf spring disposed at a substantial angle to the springs of said pair, said further spring being connected to said fixed anchor means at one end and connected at its opposite end to said beam member to assist and stabilize said suspension, and a third substantially horizontal leaf spring disposed between said pair of horizontal leaf springs and connected adjacent its opposite ends to said beam and receptacle members.

References Cited

UNITED STATES PATENTS

| 2,741,450 | 4/1950 | Thayer et al. | 177—118 X |
| 3,026,954 | 3/1962 | Appius | 177—299 X |
| 3,062,308 | 11/1962 | Anderson et al. | 177—255 X |
| 3,148,742 | 9/1964 | Giulie | 177—46 |

FOREIGN PATENTS

| 569,382 | 1/1959 | Canada. |

RICHARD B. WILKINSON, *Primary Examiner.*

G. H. MILLER, JR., *Assistant Examiner.*